United States Patent [19]

Baldwin et al.

[11] Patent Number: 4,581,391

[45] Date of Patent: Apr. 8, 1986

[54] ABLATIVE INSULATING MATERIALS OF HIGH VINYL CONTENT

[75] Inventors: James C. Baldwin; Gary W. Meyers; Robert A. Rhein, all of Ridgecrest, Calif.; Kenneth J. Wynne, Falls Church, Va.

[73] Assignee: The United States of America as represented by the Secretary of the Navy, Washington, D.C.

[21] Appl. No.: 682,140

[22] Filed: Dec. 17, 1984

[51] Int. Cl.$^4$ ............................ C08K 3/36; C08K 3/04
[52] U.S. Cl. .................................. 523/179; 524/862; 524/865; 524/866; 524/789
[58] Field of Search ............... 524/588, 862, 865, 866; 523/179

[56] References Cited

U.S. PATENT DOCUMENTS

| | | |
|---|---|---|
| 3,268,359 | 8/1966 | Boyd et al. ........................ 117/132 |
| 3,380,941 | 4/1968 | Dittman et al. ................... 523/179 |
| 3,506,607 | 4/1970 | Bobear .............................. 523/179 |
| 3,623,904 | 11/1971 | Ramsever ....................... 117/135.1 |
| 3,844,992 | 10/1974 | Antonen ........................... 524/862 |
| 3,868,346 | 2/1975 | Merrill ............................. 523/179 |
| 3,957,713 | 5/1976 | Jeram et al. ..................... 524/862 |
| 4,022,747 | 5/1977 | Itoh et al. ........................ 524/865 |
| 4,052,357 | 10/1977 | Marinik ........................... 524/588 |
| 4,370,365 | 1/1983 | Takamizawa et al. ............ 524/862 |
| 4,427,801 | 1/1984 | Sweet .............................. 524/862 |

Primary Examiner—Lewis T. Jacobs
Attorney, Agent, or Firm—Robert F. Beers; W. Thom Skeer

[57] ABSTRACT

The use of high vinyl-containing vinylmethylsiloxane polymers as high temperature insulating materials.

9 Claims, 4 Drawing Figures

ABLATIVE INSULATING MATERIALS OF HIGH VINYL CONTENT

BACKGROUND OF THE INVENTION

1. Field of the Invention

This invention relates to ablative coatings. More particularly, this invention relates to the use of high vinyl-containing vinylmethylsiloxane polymers as high temperature insulating materials.

2. Description of the Prior Art

A number of rigid, thermally stable materials are suitable for use as ablative insulation. However, corresponding elastomeric materials are not nearly as thermally resistant in the virgin state. The elastomeric materials currently used as ablative insulation are conventional two-part addition-cure RTV silicone rubber materials. They have very low vinyl concentrations, generally less than 0.5 mole percent vinylmethylsiloxane. These materials use a small amount of free vinyl groups prior to cure to form sites for cross-linking during cure. The free vinyl groups are then essentially used up in the cure reaction. Typical conventional elastomers are dimethylsiloxane (DMS) and copolymers such one containing about 30 mole percent methylphenylsiloxane and about 70 mole percent dimethylsiloxane (MPS-DMS). The latter polymer also contains a small amount, about 0.14 mole percent, of vinylmethylsiloxane to facilitate the platinum-catalyzed addition cure reaction to produce the desired gumstock.

The substitution of vinyl groups into a siloxane copolymer is a high vinyl concept which assures a very high concentration of free vinyl groups after cure which are then available for thermally activated cross-linking when exposed to the high thermal flux environment of the operating combustor. For this reason, vinyl substituted polymers are more stable than dimethylsiloxane polymers. The siloxane copolymers exhibit thermal stabilities on the order of 800° F. (427° C.) compared to conventional silicone stabilities of about 450° F. (232° C.). Further, resistance to thermal degradation increases with increasing vinyl content.

An improved lining material with increased erosion resistance, increased resistance to aeroheating loads and increased bonding to propellants is desired. These demands are met by silicone elastomers of high vinyl content which when suitably filled, offer the advantage of forming a nonvolatile char which is itself insulating and helps protect the underlying substrate in very high temperature insulating environments, such as combustion chambers.

SUMMARY OF THE INVENTION

An object of this invention is to provide an insulating composition.

A further object of the present invention is to provide an improved insulation for lining the combustion chambers of airbreathing propulsion systems.

These and other objects have been demonstrated by the present invention wherein the high temperature insulating composition comprises a siloxane base polymer, a filler, a curing agent cross-linker and a catalyst.

DESCRIPTION OF THE PREFERRED EMBODIMENT

Figure 1:
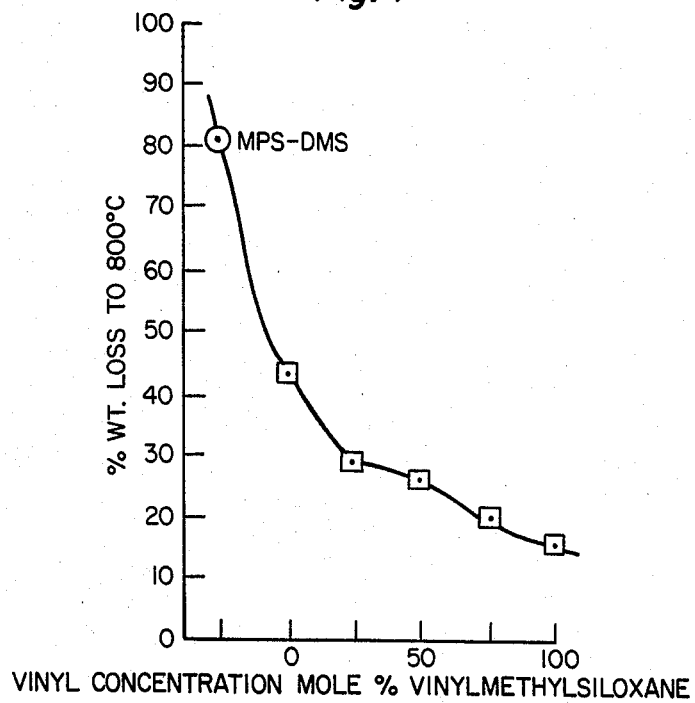
FIG. 1 shows percent weight loss to 800° C. for the state of the art copolymer MPS-DMS, and the vinylmethylsiloxane (VMS) copolymer at 0, 25, 50, 75 and 100% VMS.

The composition of ablative insulation material consists mainly of a base polymer, a catalyst, a curing agent crosslinker and a filler(s). The catalyst used here is a platinum containing material, preferably chloroplatinic acid containing 3–3.5% platinum in cyclic vinylsiloxane.

The present invention involves the utilization of certain siloxane polymers containing high molar percentages of the vinylmethylsiloxane unit as elastomeric binders for ablative insulation, to give increased performance in resistance to ablation/erosion in a high combustion gas velocity, high flux thermal environment.

The copolymers tested were vinylmethylsiloxane-dimethylsiloxane copolymers (VMS-DMS) containing about 25–99 mole percent of the VMS copolymer (the remainder being DMS), and a copolymer containing about 100 mole percent of VMS. Comparisons are presented between these copolymers and those currently in use, DMS and MPS-DMS. Table 1 presents molecular weight (number and weight average) and viscosity data, showing a molecular weight range of about 22,000–24,000 and a viscosity range of about 650–1690 centipoises.

TABLE 1

| | Molecular weight and viscosity data for uncured, unfilled silicone elastomer base polymers | | | | |
|---|---|---|---|---|---|
| MATERIAL | | $M_n$ | $M_w$ | DISPERSIVITY ($M_n/M_w$) | VISCOSITY, cps (25–28° C.) |
| MPS-DMS copolymer | | 35600 | 43000 | 1.2 | 1740 |
| 0% VMS (100% DMS) copolymer | | 16100 | 30000 | 1.8 | 1680 |
| 25% VMS copolymer | | 12800 | 24000 | 1.9 | 740 |
| 50% VMS copolymer | | 12200 | 22000 | 1.8 | 650 |
| 75% VMS copolymer | | 12300 | 22000 | 1.8 | 1060 |
| 100% VMS copolymer | | 14100 | 24000 | 1.7 | 1690 |

The percentages listed in Table 1 and in subsequent tables are the molar percentages of VMS relative to DMS. Table 1 is for uncured, unfilled samples. A typical sample when filled and cured has the following general composition: about 40–45% base polymer; about 0.25–0.75% catalyst; about 5–9% curing agent cross-linker; and about 50% filler.

The penetration torch testing experiments, designed to rank materials as to resistance to ablation/erosion in a high combustion gas velocity, high flux thermal environment, demonstrate that the high vinyl-containing materials do outperform the elastomers currently in use, such as dimethylsiloxane which contain essentially no free vinyl groups after cure. This determination is based upon comparison of materials of otherwise identical composition and the VMS concentration is 50 mole percent or greater.

Penetration is measured with the Linde jet piercing torch with an oxygen/fuel ratio of 1.94:1, surface temperature of 3610° F. (1990° C.) and an average heat flux of 1340 Btu/ft$^2$-sec. Oxygen flow is set to 17.4 std ft$^3$/min and kerosene flow is 0.800 lb/min. The averaged penetration times and sample durometers are given in Tables 2 and 3.

TABLE 2

Torch Penetration Test Results in Cured Samples of Ablative Rubber, Group A

| MATERIAL | Penetration Time, sec | n | Std. Dev. | Durometer (shore A) |
|---|---|---|---|---|
| MPS-DMS - aged | 130 | 3 | 4 | 68 |
| MPS-DMS - fresh | 166 | 2 | 11 | 70 |
| 75% VMS (5% XL) | 162 | 1 | — | 65 |
| 100% VMS (5% XL) | 186 | 2 | 3 | 66 |
| 100% VMS (9% XL) | 192 | 1 | — | 85 |

TABLE 3

Torch Penetration Test Results on Cured Samples of Ablative Rubber, Group B

| MATERIAL | Penetration Time, sec | n | Std. Dev. | Durometer (shore A) |
|---|---|---|---|---|
| MPS-DMS - fresh | 227 | 1 | — | 70 |
| 25% VMS (7.3% XL) | 64 | 2 | 15 | 84 |
| 50% VMS (5% XL) | 204 | 2 | 12 | 70 |
| 75% VMS (5% XL) | 222 | 2 | 20 | 65 |
| 100% VMS (5% XL) | 271 | 1 | — | 66 |
| 100% VMS (9% XL) | 260 | 1 | — | 85 |

The penetration times are averages of "n" determinations with the standard deviation (std. dev.) reported. "XL" is the curing agent cross-linker. The preferred one is a polymethylhydro (65–70%) dimethylsiloxane copolymer having a molecular weight of 2000–2100.

Figure 3:
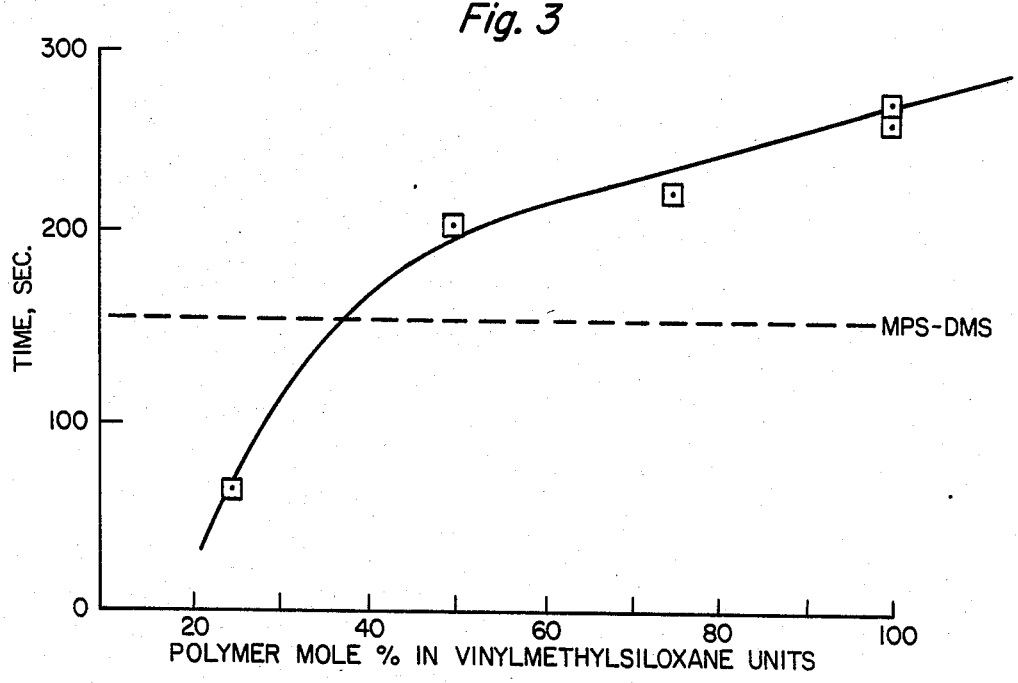
FIG. 3 shows the penetration time in seconds for various percentages of the VMS groups in the copolymer. The state of the art copolymer MPS-DMS is shown as having a penetration time of around 150 seconds.

The data is divided into two separate groups since Group B is influenced by a reproducible experimental condition that causes the burnthrough path to be angled upward, and thus lengthened relative to the more normal Group A data. Consequently, only data within a group is comparable. FIG. 3 is a general representation of how penetration time increases with increasing VMS content.

In addition, the "soft char layer" typical of char formation in the state of the art elastomers, which is a result of reversion of the base elastomer to liquid and gaseous products prior to pyrolysis and char deposition, is absent in the charred VMS-containing materials. This conversion of the virgin rubber to the hard uncharred material which occurs prior to actual charring of the post-test VMS-containing specimens, is consistent with the formation of a hard thermoset material prior to pyrolysis.

Relatively high concentrations of free vinyl moieties are present in the VMS-containing material. Therefore, formation of the hard thermoset material is a result of the cross-linking of these free vinyl groups prior to pyrolysis. The absence of the soft char layer and related swelling provides increased erosion resistance and improved dimensional stability in the new insulation over that of the elastomer materials used previously.

Various fillers can be utilized with the elastomer such as silica ($SiO_2$), silicon carbide (SiC) and carbon fiber. Higher melting fillers such as zirconia or zirconium silicate (zircon) powders and fibers rather than silica further capitalize on the char-forming properties of the VMS elastomers.

The presence of the free vinyl appears to greatly decrease weight loss of the insulation thus increasing char formation with concomitant increase in the temperature of 10% weight loss as measured by TGA relative to dimethylsiloxane (DMS) and MPS-DMS in the unfilled, cured rubber gumstocks. TGA data is presented in Table 4.

TABLE 4

TGA Data on Samples of Unfilled Cured Silicone Rubbers

| MATERIAL | $T_5$ °C. | $T_{10}$ °C. | $T_{20}$ °C. | TOTAL WEIGHT LOSS, % |
|---|---|---|---|---|
| MPS-DMS | 365 | 438 | 468 | 81 |
| 0% VMS (100% DMS) | 395 | 443 | 510 | 44 |
| 25% VMS | 410 | 460 | 540 | 29 |
| 50% VMS | 455 | 510 | 560 | 26 |
| 75% VMS | 365 | 495 | 685 | 20 |
| 100% VMS | 470 | 520 | — | 16 |

Table 4 shows the temperatures of decomposition for several weight loss percentages. $T_5$, $T_{10}$ and $T_{20}$ are temperatures of actual 5, 10 and 20% weight loss at a heating rate of 5° C. per minute. Total weight loss is the percentage of sample weight lost to 800° C. The normal criterion of examining the temperature at 20% weight loss as a measure of thermal stability was modified since the char forming ability of the copolymers high in mole percent VMS and did not lose 20 weight percent even to the 800° C. limit of the TGA apparatus.

Figure 2:
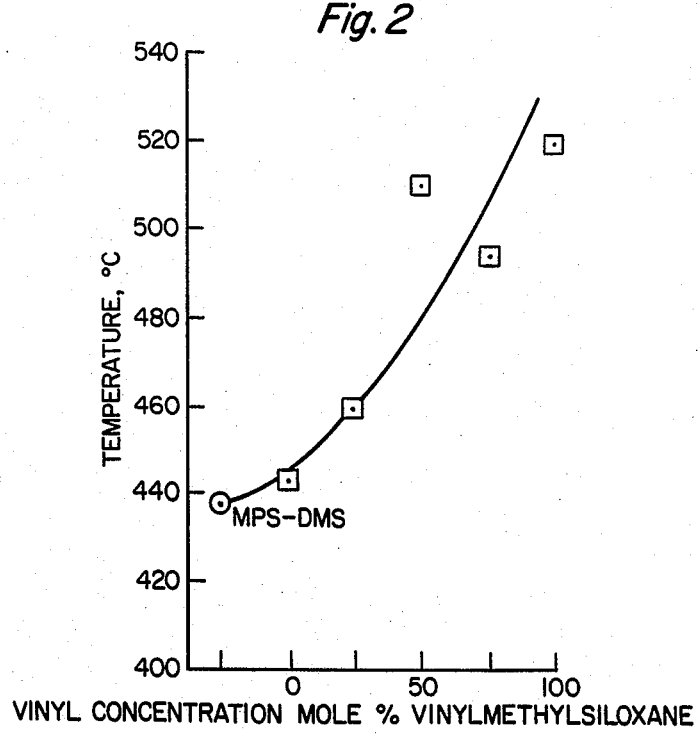
FIG. 2 shows the temperature at 10% weight decrease for the same polymers as in FIG. 1.

The change in total weight loss with increasing mole percent vinyl is shown in FIG. 1 while FIG. 2 shows the increase in the temperature at 10% decomposition (weight loss) with increasing vinylmethylsiloxane concentration. The high concentration of unreacted vinyl groups along the polymer chain results in greatly reduced weight loss and a respectable increase in the temperature of catastrophic decomposition, although the TGA curves of FIG. 4 indicate that the onset of thermal decomposition is an inert atmosphere remains the same.

Figure 4:
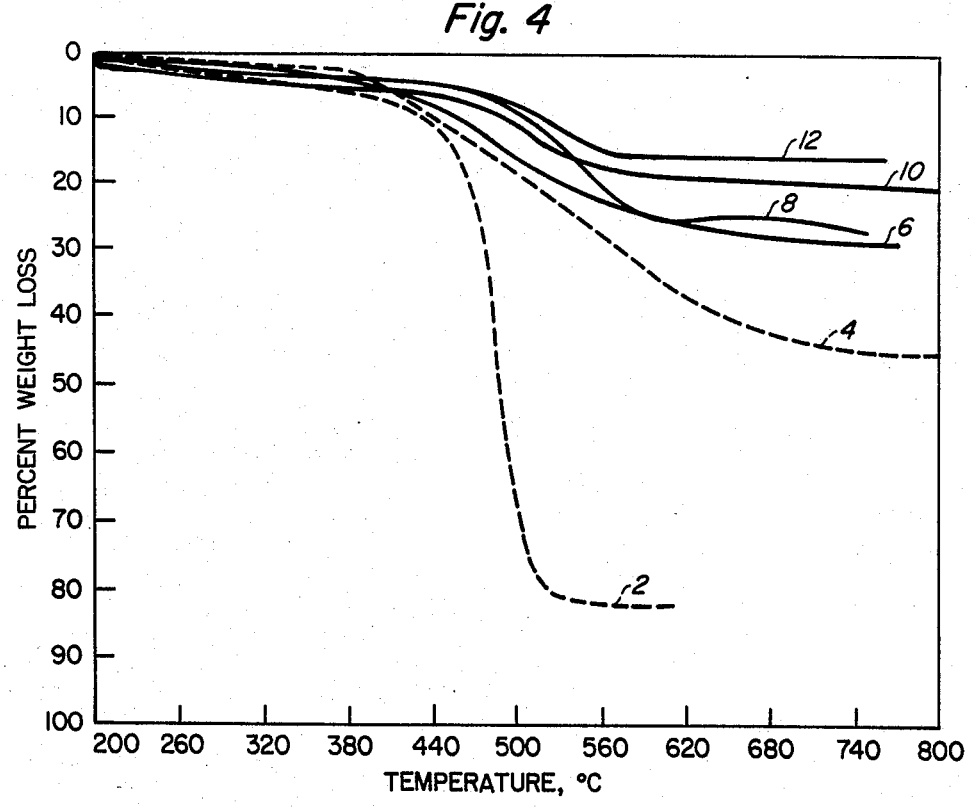
FIG. 4 shows additional thermogravimetric analysis (TGA) weight loss data.

More specifically, FIG. 4 shows weight loss data for a variety of compositions. Plot 2 is that of MPS-DMS with a cure ratio of 2:10. Plot 3 is that of DMS, also with a 2:10 cure ratio. Plots 6, 8, 10 and 12 are indicative of the present invention, containing the vinylmethylsiloxane-dimethylsiloxane copolymer, all of which have a 1:10 cure ratio. Plot 6 is for a 25 mole percent VMS composition, plot 8 for 50 mole percent, plot 10 for 75 mole percent and plot 12 for 100 mole percent.

A further characteristic of the VMS-containing copolymers is that their bondability to propellants and other materials increases due to the fact that the vinyl moiety is a reactive group that can be directly bonded to chemically and/or activated chemically on the surface.

What is claimed is:

1. A high temperature insulating composition consisting essentially of:

about 40–45 mole percent of a vinyl-containing siloxane base polymer;

about 50 mole percent of filler selected from the group comprising: silica, silicon carbide and carbon fiber;

about 5–9 mole percent of polymethylhydrodimethylsiloxane copolymer; and about 0.25–0.75 mole percent of chloroplatinic acid.

2. The composition of claim 1 wherein said chloroplatinic acid contains 3–3.5% platinum in cyclic vinylsiloxane.

3. The composition of claim 1 wherein said siloxane base polymer has a molecular weight within the range of about 22,000–24,000.

4. The composition of claim 1 wherein said siloxane base polymer has a viscosity at 25°–28° C. within the range of about 650–1690 centipoises.

5. The composition of claim 1 wherein said siloxane base polymer is vinylmethylsiloxane.

6. The composition of claim 1 wherein said siloxane base polymer is a copolymer comprising from about 25 to about 99 mole percent vinylmethylsiloxane and from about 1 to about 75 mole percent dimethylsiloxane.

7. The polymer of claim 6 wherein said copolymer comprises about 25 mole percent vinylmethylsiloxane and about 75 mole percent dimethylsiloxane.

8. The polymer of claim 6 wherein said copolymer comprises about 50 mole percent vinylmethylsiloxane and about 50 mole percent dimethylsiloxane.

9. The polymer of claim 6 wherein said copolymer comprises about 75 mole percent vinylmethylsiloxane and about 25 mole percent dimethylsiloxane.

* * * * *